United States Patent
Trees (10) Patent No.: US 11,303,660 B2
(45) Date of Patent: Apr. 12, 2022

(54) COMPUTER-PROTECTION SYSTEM AND METHOD FOR PREVENTING A NETWORKED COMPUTER FROM EXECUTING MALICIOUS CODE

(71) Applicant: Terry Edward Trees, Denver, CO (US)

(72) Inventor: Terry Edward Trees, Denver, CO (US)

( * ) Notice: Subject to any disclaimer, the term of this patent is extended or adjusted under 35 U.S.C. 154(b) by 215 days.

(21) Appl. No.: 16/552,860

(22) Filed: Aug. 27, 2019

(65) Prior Publication Data

US 2020/0244687 A1    Jul. 30, 2020

Related U.S. Application Data (60) Provisional application No. 62/796,509, filed on Jan. 24, 2019.

(51) Int. Cl.
*H04L 29/06* (2006.01)
*G06F 21/52* (2013.01)

(52) U.S. Cl.
CPC ........ *H04L 63/1425* (2013.01); *H04L 63/105* (2013.01); *H04L 63/1441* (2013.01); *H04L 63/20* (2013.01)

(58) Field of Classification Search
CPC .............. H04L 63/145; H04L 63/1408; H04L 63/1466; H04L 63/20; H04L 63/1425; H04L 63/105; H04L 63/1441; G06F 2221/034; G06F 21/53; G06F 21/71; G06F 12/145

See application file for complete search history.

(56) References Cited

U.S. PATENT DOCUMENTS

| | | | | |
|---|---|---|---|---|
| 6,928,482 B1* | 8/2005 | Ben Nun | ............ | H04L 67/1008 370/235 |
| 2008/0117908 A1* | 5/2008 | Kuo | ........................ | H04L 45/00 370/392 |
| 2008/0313735 A1* | 12/2008 | Harrison | ................. | G06F 21/51 726/23 |

(Continued)

OTHER PUBLICATIONS

Ko et al., "Vulnerability Detection of Multiple Layer Colluding Application through Intent Privilege Checking," 2015 5th International Conference on IT Convergence and Security (ICITCS) Year: 2015 | Conference Paper | Publisher: IEEE.*

(Continued)

*Primary Examiner* — Roderick Tolentino
(74) *Attorney, Agent, or Firm* — Lathrop GPM LLP (57) ABSTRACT

A system and method prevent a networked computer connected to a secure network from executing malicious code. A data language system labels bits within the secure network; where each bit received from sources outside the secure network is labeled as data. Programs loading onto the networked computer from within the secure network are labeled as program code. A processor of the networked computer is modified to inhibit execution of instructions that have bits labeled as data. For a two-state or three-state bit computer, each bit is labeled by inserting/adding an adjacent label-bit to indicate data or program code. For four and higher bit state computers, two of the bit values (e.g., zero and one) are used for data and other bit values (e.g., two and three) are used for program code.

8 Claims, 2 Drawing Sheets

(56) References Cited

U.S. PATENT DOCUMENTS

| | | | | |
|---|---|---|---|---|
| 2012/0210416 | A1* | 8/2012 | Mihelich | H04L 67/1004 |
| | | | | 726/11 |
| 2013/0250763 | A1* | 9/2013 | Assarpour | H04L 41/0213 |
| | | | | 370/235 |
| 2014/0331019 | A1* | 11/2014 | Parker | G06F 12/1458 |
| | | | | 711/163 |
| 2016/0072733 | A1* | 3/2016 | Murray | H04L 49/351 |
| | | | | 370/395.53 |
| 2019/0005239 | A1* | 1/2019 | Park | G06F 21/563 |
| 2019/0132334 | A1* | 5/2019 | Johns | G06F 21/56 |
| 2019/0347413 | A1* | 11/2019 | Dubrovsky | G06F 21/53 |

OTHER PUBLICATIONS

Sion et al., "Rights protection for discrete numeric streams," IEEE Transactions on Knowledge and Data Engineering Year: 2006 | vol. 18, Issue: 5 | Journal Article | Publisher: IEEE.*

* cited by examiner

COMPUTER-PROTECTION SYSTEM AND METHOD FOR PREVENTING A NETWORKED COMPUTER FROM EXECUTING MALICIOUS CODE

CROSS REFERENCE TO RELATED APPLICATION

This application claims priority to U.S. Provisional Application No. 62/796,509 filed on Jan. 24, 2019, the contents of which is hereby incorporated by reference in its entirety.

BACKGROUND

Conventionally, a computer memory stores information. With respect to a digital processor, that information may include program code that is machine readable instructions executable by the processor, and data that is manipulated by the processor. That is, the program code is specifically interpreted by the processor as an instruction for the processor to execute, whereas the data is not interpreted as an instruction to be executed. Typically, the program code is stored in one area of the memory, and data is stored in a separate area of the memory. The processor is then directed to execute the program code from the first area to process the data in the second area. The processor itself cannot distinguish between executable code and data values.

A computer virus takes advantage of the fact that, to the processor, the program code and the data are both just values stored at a location in memory. What distinguishes program code and data is the way they are interpreted by the processor. Erroneous computer behavior occurs when the processor is directed to execute data as if it is program code. Such erroneous behavior is exploited by hackers when attempting to gain control of a computer system. For example, malicious software may load values of instructions into memory as data, and then direct the processor to execute that data as program code, such that control of the computer may be lost to the rightful owner or user of the computer.

DETAILED DESCRIPTION OF THE EMBODIMENTS

Terminology

Fixed Function Hardware Circuit—an electrical/mechanical/electro-mechanical circuit whose function cannot be altered by any means. Once the circuit is built it does the same thing without ever changing.

Label-bit or Labeling Bit or Icon Bit—is the first bit of an "Icon-labeled bit-pair" and is inserted before each original data bit in 2-state and 3-state bit computers.

Labeled Bit or Icon Labeled Bit—is the original data bit that has been labeled by inserting a bit in front to create an "Icon-labeled bit-pair."

Icon-labeled bit-pair or Labeled bit-pair—a program or data bit that has had a label of 0, 1, or 2 or 3 (in the case of 3-state or 4-state bit computers) value bit placed in front of it, using the data language system, to create an "Icon-labeled bit-pair."

Data Language—a pattern of marked bits whose data can be used normally by programming languages, but which is non-interactive with and prevents execution of all non-approved programs or executable commands.

2-state, 3-state, 4-state, and 6-state, bit computers. A 2-state bit computer is a conventional binary based computer, where each bit may have a value of zero or one. Computers using bits with more than two states are uncommon. A 3-state bit (a ternary digit, or trit) may have values of zero, one, and two; a 4-state bit (a quaternary bit) may have values of zero, one, two, and three; and so on.

Secure Network—a computer environment with at least one computer and a network providing an interface external to the computer environment. The secure network is protected from malware, hacking, Trojans, computer viruses, and other similar attacks, through use of the embodiments described herein.

Overview

Embodiments disclosed herein prevent loss of control of a computer through virus, hacking, and other such attacks that rely upon insertion of malicious program code into the computer and then causing the computer to execute that code. By labeling each bit within a secure network as either program code or data, configuring the processor to only execute bits labeled as program code, and treating bits received from external to the secure network as data, the computer is prevented from executing data loaded into the computer. A fixed-function hardware circuit must be included to label each bit transferred into the secure network from an external source as data. Thus, any information received from an external source is automatically labeled as data within the secure network (e.g., a protected computer environment). A similar hardware circuit must be included to remove the label from each bit when transferring data from the secure network to an external destination. Accordingly, to a world outside the secure network, the data appears as conventional data values and thus the operation of computers within the secure network is hidden from the outside world. Within the secure network, labeled bit-pairs are handled by changes to software and/or changes to microcode of processor(s) such that the processor cannot execute bits labeled as data, and cannot change the label of bits from data to program code. Advantageously, the processor cannot be fooled into executing data values (e.g., bits received from external sources) as program code, since externally received bits are always labeled as data within the secure network. Thus, the computer(s) within the secure network is not vulnerable to attacks, such as a virus, a Trojan, malware, spyware, or malign code. A computer that implements 4-state quaternary (and higher) bits will not need to have bits inserted into incoming data or require spacing adjustments to software to obtain the same results.

2-State Bit Computer Systems

Figure 1:
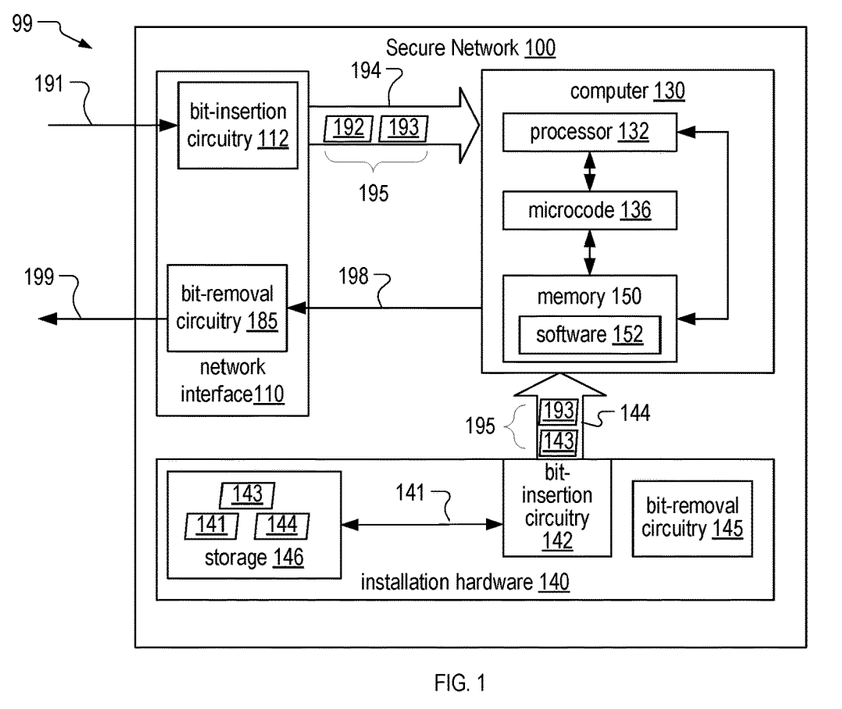
FIG. 1 is a block diagram showing a computer-protection system for preventing a networked computer from executing malicious code, in an embodiment.

FIG. 1 is a block diagram showing a computer-protection system 99 for preventing a networked computer 130 from executing malicious code. Secure network 100 is shown with an input bitstream 191 entering, and a bitstream 199 exiting. Secure network 100 is a protected computer environment illustrating one example of the computer-protection system 99. Secure network 100 includes a network interface 110, at least one computer 130, and (IT department controlled) program installation hardware 140. In embodiments, network interface 110 includes at least one of a modem, a router, an edge router, a gateway, and a network switch.

In one embodiment, computer 130 is a 2-state bit computer. Computer 130 includes a processor 132, a memory 150, and microcode 136. Memory 150 stores software 152 (e.g., machine readable instructions executable by processor 132). Microcode 136 may be part of processor 132 and/or may be part of memory 150.

Network interface 110 includes hardware bit-insertion circuitry 112, which inserts one label-bit 193 in front of each input bit 192 received within input bitstream 191 to form a data language data labeled bitstream 194. Label-bit 193 may have a value of zero, and is set to indicate data by bit-insertion circuitry 112. Label-bit 193 may also be called an icon label-bit, and input bit 192, which it labels, may be called an icon-labeled bit. Each label-bit 193 and input bit 192 may be referred to herein as an icon-labeled bit-pair 195. Network interface 110 must include bit-removal circuitry 185 that receives a bitstream 198 for output from secure network 100 from computer 130 and removes label-bits 193 (e.g., alternate bits) from bitstream 198 to form an output bitstream 199 as conventional unlabeled data.

Bit-insertion circuitry 112 and bit-removal circuitry 185 are each implemented as a fixed function hardware circuit and may each include at least one of digital electronics, a processor, and a memory storing software executable by the processor to implement the functionality of circuitry 112 and 185 described in embodiments disclosed herein.

Installation hardware 140 (with use controlled by the IT department) includes program bit-insertion circuitry 142 and storage 146. In certain embodiments, installation hardware 140 also includes bit-removal circuitry 145. Bit-insertion circuitry 142 and bit-removal circuitry 145 are similar to bit-insertion circuitry 112 and bit-removal circuitry 185, respectively, except that bit-insertion circuitry must label each bit as either program code or data depending on which bit-insertion hardware device is selected by the IT department (for data or program labeled bits).

Programs are installed on computer 130 from storage 146, which may represent at least one of a hard drive, an optical drive, and an SD card. Storage 146 may be removable and/or read removeable media. Bit-insertion circuitry 142 inserts one program label-bit 193, e.g., a one-value bit (L=1), in front of (or in certain embodiments after) each program bit 143 of bitstream 141 corresponding to executable code stored by storage 146, to form program labeled bitstream 144. Labeled bitstream 144 thereby includes program bits 143 of bitstream 141 interleaved with label-bits 193. Accordingly, installation of programs (software) onto computer 130 within secure network 100 is controlled, and the programs may be executed by computer 130 with no restrictions.

In certain embodiments, storage 146 includes bit-insertion circuitry 142 and bit-removal circuitry 145 in various combination pairs (in/out), which would allow translation of data from and to any other icon-pair bit format. Only installation hardware 140 can label bits as program code to form software 152. Processor 132, when executing instructions (e.g., read, write, delete, etc.) of software 152, only operates with icon-labeled bit-pairs 195; two bits are read, written, deleted, etc., and processor 132 cannot operate using only one bit. That is, processor 132 (e.g., via microcode 136) is configured to only handle bits in pairs (an icon-labeled bit-pair) at any time for any single executable instruction of software 152. Particularly, the processor (e.g., circuitry and/or microcode 136) is configured to only execute instructions labeled as program code, and to implement instructions to process data bits in pairs. In certain embodiments, for a conventional 2-state bit computer, software 152 may also be modified to account for the data occupying more space (each bit of original data is labeled as a data language icon-labeled bit-pair).

These changes to software 152 and hardware (e.g., microcode 136) form a data language that is functional on current 2-state bit computers and computer systems, such as embodiments of computer 130. A first change is that software 152 executed on computer 130 requires two bits being read (an "icon-labeled bit-pair") for each single bit of original "data." In embodiments, the spacing of current program routines and processes (that output, execute, manipulate, or create data) may be adapted to use the icon-labeled bit-pairs 195 so that correct bit-pair labeling and spacing is maintained throughout normal operation of computer and program processes.

In certain embodiments of secure network 100, programs and their routines executed by computer 130 use icon-labeled bit-pairs 195 as the smallest useable/readable unit (the programs cannot read/process single bits; both bits of each icon-labeled bit-pair are read/processed/written together). At a program/process level, only one (e.g., the second) bit of the icon-labeled bit-pair is used for the actions within the program/process (essentially skipping the other (e.g., first) bit of any icon-labeled bit-pair). That is, programs may just read and use every other bit (the data/program bit), but must read/write create/delete all output as icon-labeled bit-pairs (with a label-bit followed by the data/program bit). Any executable commands used by the computer can only use two bits at a time (icon-labeled bit-pairs 195). No executable commands can execute a single bit command or output a single bit in any form.

Figure 2:
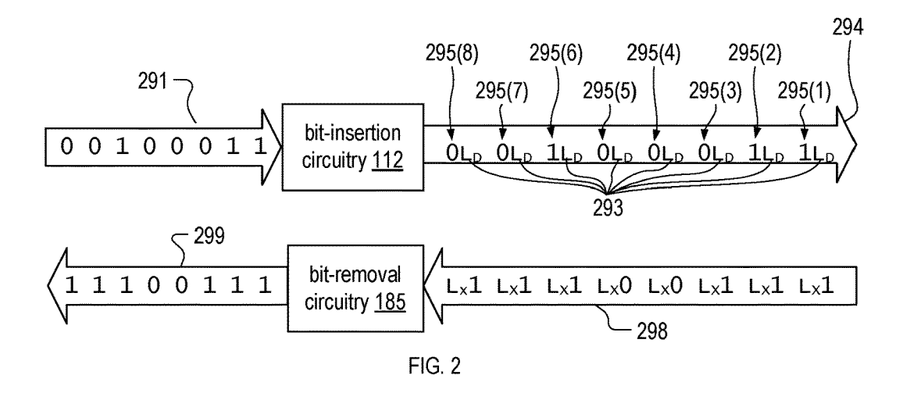
FIG. 2 illustrates extra-network incoming data having a data label-bit inserted before each incoming bit and bit-removal circuitry removing label-bits from a segment of an intra-network bitstream and outputting a byte to an extra-network destination, in an embodiment.

FIG. 2 is a schematic showing bit-insertion circuitry 112 inserting a plurality of data label-bits 293, represented as "$L_D$," into a one-byte segment 291 of input bitstream 191 to form a labeled bitstream 294. Label-bits 293 and bitstream 294 are respective examples of label-bits 193 and labeled bitstream 194. FIG. 2 also illustrates bit-removal circuitry 185 removing label-bits 293, represented as "$L_X$," from bitstream 298 (where "$L_X$" represents either a data label $L_D$ or a program label $L_P$) and outputting a byte 299. Bitstream 298 is an example of bitstream 198. Bitstream 199 may include byte 299.

In the example of FIG. 2, bitstream 294 includes the eight bits of one-byte segment 291 each paired with a respective label-bit 293. Each bit and label-bit 293 is part of a respective icon-labeled bit-pair 295 of bitstream 294. In FIG. 2, icon-labeled bit-pairs 295 are indexed from one to eight, where the ascending index denotes a chronological order in which the bit-pairs 295 are generated by bit-insertion circuitry 112.

In embodiments, a label-bit 293 equaling a first of two binary values (e.g., $L_D=0$) denotes that the following bit of one-byte segment 291 is a data bit. When label-bit 193 equals a second of the two binary values (e.g., $L_P=1$), the following bit is a program bit; however, all data received via network interface 110 is labelled as data by bit-insertion circuitry 112.

This creates the existence of a data language within secure network 100 that is labeled and monitored on a bit level. Any conventional 2-state bit computer may use this approach with minimal changes to the hardware (e.g., by inserting bit-insertion circuitry 112 and putting deletion commands in microcode 136) and software 152 (e.g., by adjusting spacing for the label-bit which has been inserted) and by only getting software from a clean secure source. As shown in bitstream 294, a data language value occupies twice the amount of memory space within secure network 100 as compared to the same data value stored outside secure network 100.

Figure 3:
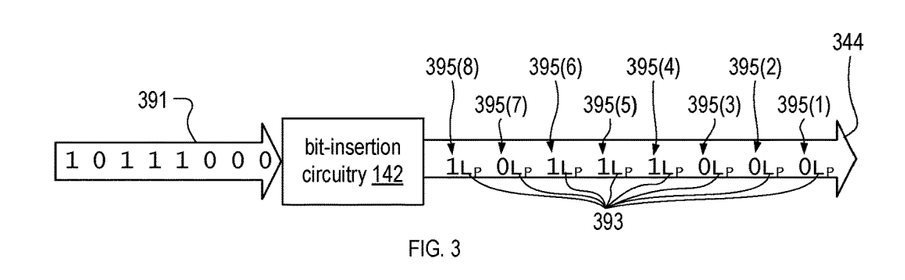
FIG. 3 is a schematic showing bit-insertion circuitry inserting a program label-bit before each incoming bit of a program input bitstream and outputting a program bit-labeled bitstream, in an embodiment.

FIG. 3 is a schematic showing bit-insertion circuitry 142 inserting a plurality of label-bits 393, represented as "$L_P$" (e.g., $L_P=1$), into a byte 391 of input bitstream 141 to generate a data language icon-labeled bit-pair program bitstream 344 using icon-labeled bit-pairs 395 (value $L_P=1$ labels the following bit as a program bit to form a program icon-labeled bit-pair). Label-bits 393 (e.g., $L_P=1$) and program bitstream 344 are examples of the data language icon-labeled bit-pair system circuitry creating a labeled-bit program bitstream. This is shown in FIG. 1 by label-bits 193 and labeled bitstream 144 respectively. Note that by switching the circuitry to change the label-bit from a 1 to a 0 value allows conversion of the data stream to either data or program icon-label bit pairs.

Figure 4:
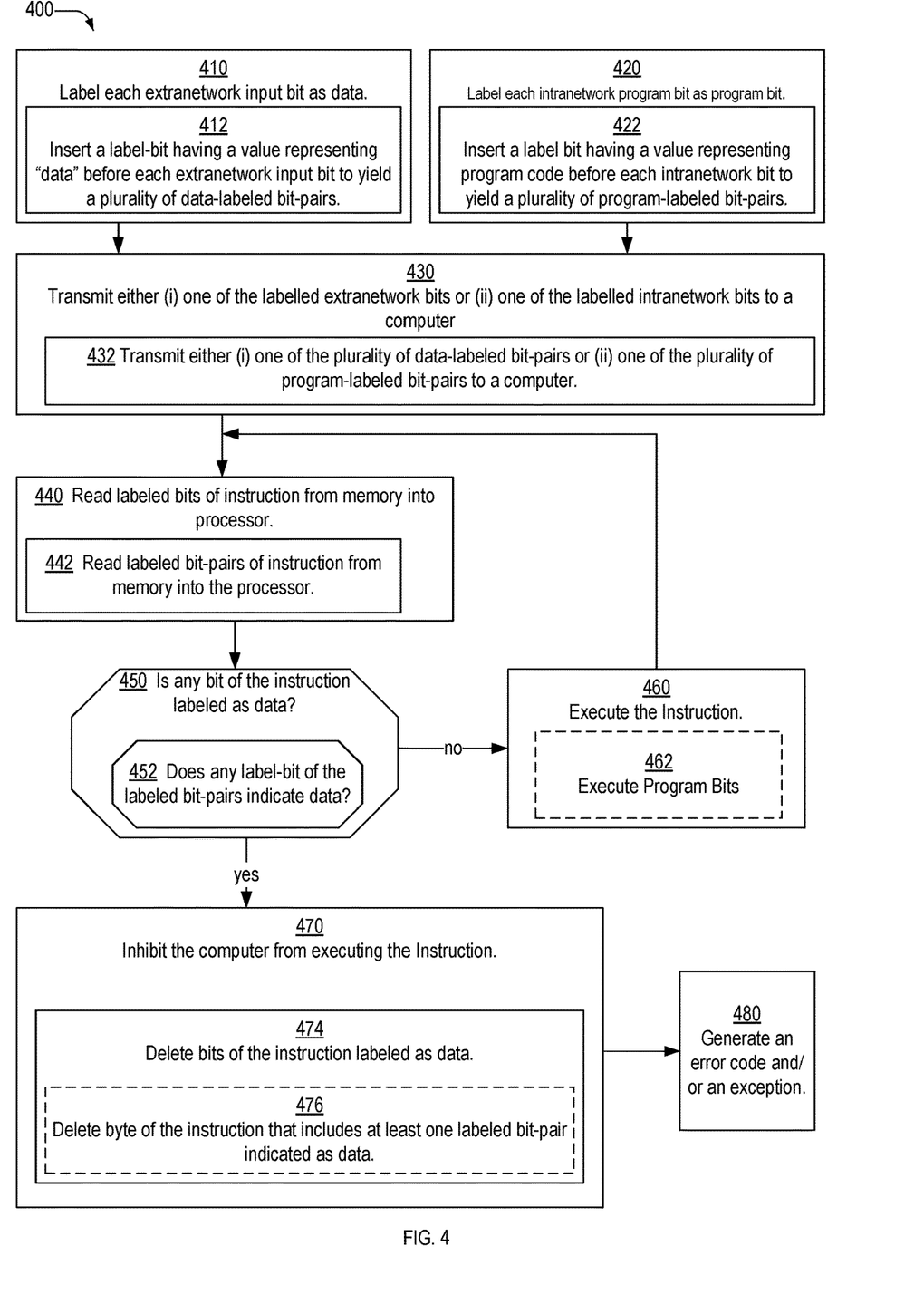
FIG. 4 is a flowchart illustrating one example method for preventing a computer from executing code received from outside the computer's network, in an embodiment.

FIG. 4 is a flowchart illustrating one example method 400 for preventing a computer from executing data received from outside the computer's network, which may contain malicious code. The computer may be a two-state bit computer that monitors and deletes viral and non-approved executable programs from the computer when they try to execute. Method 400 includes at least one of steps 410, 420, 430, 440, 450, 460, 470, and 480. In embodiments, one or more components of secure network 100 executes one or more steps of method 400. For example, method 400 is implemented by at least one of bit-insertion circuitry 112, bit-removal circuitry 185, installation hardware 140, and microcode 136 of computer 130. In embodiments when computer 130 is a 2-state bit computer, steps 410, 420, 430, 440, 450, 460, and 470 include respective steps 412, 422, 432, 442, 452, 462, and 472.

In embodiments, method 400 is compatible with a network (e.g., secure network 100) in which all software installation is done by an administrator of secure network 100. Within secure network 100, the administrator may clear all software of any virus or malign type of contamination. Accordingly, within secure network 100, software 152 may be installed from storage 146 onto computer 130 without problem, using installation hardware 140 for example. All software 152 installed this way within secure network 100 runs normally using the described labeled bit-pairs 395 (e.g., using the label-bit patterns: data bit or program bit). Any attempt to install malign program or non-approved executable code from external to secure network 100 is labeled as data and cannot be executed. Any attempt to execute bits labeled as data is detected (at the microcode or machine language level, before execution can occur, such as by generating an exception in processor 132) and the incorrect execution is prevented through deletion of that icon-labeled bit-pair or the entire byte.

Step 410 includes labeling each extra-network bit received by the network as data. Step 412 includes inserting a label-bit having a value representing "data" (e.g., $L_D=0$) before each extra-network input bit to yield a plurality of data icon-labeled bit-pairs. For example, the label-bit may have a value of 0 to represent "data", where a label-bit value of 1 represents "program code". In an example of step 412, bit-insertion circuitry 112 inserts a zero-value label-bit before each input-bit of one-byte segment 291 to yield labeled bit-pairs 295.

Step 420 includes labeling each intra-network installed machine readable instruction bit as a program bit. Step 422 includes inserting a label-bit having a value representing program code (e.g., $L_P=1$) before each intra-network installed machine readable instruction bit, en route to the computer 130, to yield a plurality of program icon-labeled bit-pairs. For example, the label-bit has a value of one to indicate program code; where a label-bit value of zero represents data. In an example of step 422, bit-insertion circuitry 142 inserts a one-value label-bit before each machine-readable instruction bit of byte 391 to yield program icon-labeled bit-pairs 395.

Step 430 includes transmitting either icon-labeled extra-network bit streams or one of the icon-labeled intra-network bitstreams to a computer. Step 432 includes transmitting, to a computer, either (i) one of the plurality of data-labeled bit-pairs created in step 412 or (ii) one of the plurality of program-labeled bit-pairs created in step 422. In one example of step 432, labeled bitstream 194 (with a plurality of icon-labeled bit-pairs 195) is sent to computer 130 and stored in memory 150. In another example of step 430, labeled bitstream 144 (with a plurality of icon-labeled bit-pairs 195) is sent to computer 130 and stored in memory 150.

Steps 440 show example operation of processor 132 when executing instructions from memory 150. Step 440 includes reading labeled bits from the memory into the processor. Step 442, for a 2-state bit computer, includes reading a first bit of the transmitted icon-labeled bit-pair into the processor. The transmitted labeled bit-pair is the icon-labeled bit-pair transmitted in step 430.

Step 450 is a decision. When the first bit of the icon-labeled bit-pairs is labeled as program (e.g., $L_P=1$), method 400 continues with step 460 (e.g., proceeds with normal execution). In one example of step 450, when processor 132 determines that the label-bit is labeled as a program icon-labeled bit-pair (e.g., $L_P=1$), method 400 continues with step 460; otherwise (e.g., if method 400 determines that the label-bit is labeled as a data icon-labeled bit-pair—$L_D=0$) method 400 continues with step 470. In step 452, for a 2-state bit computer, when the processor determines that the label-bits of each labeled bit-pair of the instructions does not indicate data, method 400 continues to execute the instruction with step 460; otherwise method 400 continues with step 470. In one example of step 452, when any one label-bit 193 of each labeled bit-pair of the instruction indicates data, method 400 proceeds to step 470.

Step 460 includes executing the instruction. Step 462 includes executing the instruction. In an example of step 460, processor 132 executes the instruction formed by the labeled bits. In one example of step 462, processor 132 executes the instruction formed by second bits of program-labeled bit-pairs 395 (e.g., after removing label-bits). After execution of step 460, method 400 continues with step 440 where, for example, the next instruction is read from memory 150.

Step 470 includes inhibiting the computer from executing the instruction. In one example of step 470, processor 132 and/or microcode 136 inhibits execution of the instruction formed by bit-pairs 295(1)-(8), where one or more label-bits 293 indicate that the instruction includes a data bit.

In certain embodiments, step 470 includes step 474. In step 474, method 400 deletes bits of the instruction labeled as data. In an example of step 474, processor 132 deletes bit-pair 295(1) from memory 150. In embodiments, step 474 includes step 476. In step 476, method 400 deletes the bytes of the instruction that includes one or more labeled bit-pairs labeled as data. In an example of step 476, computer 130 deletes a byte that includes data-labeled bit-pairs 295(1-8) from memory 150.

Step 480 includes generating an error code and/or an exception and, in embodiments, is executed after step 470. In an example of step 480, processor 132 generates an error code and/or an exception and execution of the corresponding software 152 is halted and the icon-labeled bit-pair is deleted.

In certain embodiments, secure network 100 may represent one or more of a vehicle (e.g., an automobile, an aircraft, a ship, etc.) that includes digital processing components with input/output, a structure (e.g., a factory, a school, a workplace, etc.) that include computerized equipment with input/output, and a computing device (e.g., personal computer, a smartphone, a laptop computer, etc.) with input/output. That is, the embodiments described herein may be implemented to provide security to any type of computing device that has input and output.

Although bit labeling may be used with individual computing devices (e.g., a personal computer), such devices remain vulnerable to normal virus and other malign processes when any purposefully installed software is not free from virus and malign routine free. Thus, protective procedures should be strictly followed to ensure the computing device is not vulnerable to attack.

As shown in FIG. 1, circuitry 112, 185, and 140, which, in embodiments, cannot be changed or altered by hacking or any other unintended method, are used to interface between computers and networks within secure network 100 and the devices external to secure network 100. These hardware circuits may be implemented using any of a variety of methods for the circuit mechanism, as described above.

As shown in FIG. 2, bit-insertion circuitry 112 inserts one bit before each bit received into network 102 from an "outside of the network" source. This one bit is therefore an extra-network bit. For example, bit-insertion circuitry 112 may be located in network interface 110 and located before a modem (e.g., to protect the modem also), or located immediately after the modem (before entry of the data into computer 130 within secure network 100). In other embodiments, bit-insertion circuitry 112 may be located at a modem/input port of computer 130 (e.g., before the data enters any internal part of computer 130). Anything received from a source external to secure network 100 is considered data, and is labeled as data.

As data is received through network interface 110, bit-insertion circuitry 112 inserts one bit (e.g., with a 0 value) in front of each incoming bit of data. This process labels all incoming bits as data. The inserted label-bit 193 before each incoming data bit may be called an "icon bit" and labels only the following bit. In embodiments, a zero-value bit in label-bit 193 (e.g., $L_D=0$) indicates the following bit is a data bit; and a one-value bit in label-bit 193 (e.g., $L_P=1$) indicates the following bit is a program bit. The use of an icon bit followed by a data or program bit creates a "data language" using "icon-labeled bit-pairs" to define allowable actions at a bit level (one icon bit for labeling, followed by either a data bit or a program bit).

As noted above, for a 2-state bit computer, use of icon-labeled bit-pairs 295 doubles storage requirements, since two bits are required to store each single data bit. In embodiments, secure network 100 and/or computer 130 could use a first hard drive for storing data bit-pairs and a second hard drive for storing program bit-pairs, with each hard drive using a hardware circuit, as described above, to strip the label-bit on storing to the specific hard drive, and to insert the appropriate label-bit on reading from the specific hard drive (this is one method to mitigate the extra storage space needed otherwise for full bit-pair storage). In embodiments, an approved program (installed by a network administrator, for example) writes and outputs labeled icon bit-pairs for either programs or data (either a one-value label-bit ($L_P=1$) followed by the program bit or a zero-value label-bit ($L_D=0$) followed by the data bit) with no restrictions.

Computer 130 may include microcode 136 that defines operation of processor 132. In embodiments, a second change to conventional 2-state bit computers is to modify microcode 136 to implement the data language defined above. For example, microcode 136 may be modified to evaluate the icon label-bit of each bit-pair before a command is executed (e.g., when it is first accessed/read from memory 150). This modification to microcode 136 is simple: if the first incoming bit (read from an icon-labeled bit-pair) of a bit stream is a program bit (a one-value icon label-bit, $L_P=1$), then the icon-labeled bit-pair passes into the command execution portion of processor 132 and may be executed normally, if the first incoming bit (of an icon-labeled bit-pair) is a data label-bit (a zero-value icon label-bit, $L_D=0$) then that icon-labeled bit-pair is deleted or ignored (e.g., by deleting to the end of the whole incoming byte or instruction, resetting input to start at the next complete byte, and/or causing a processor exception) since it is not labeled as program code and must not be executed. This prevents any bit labeled as data (e.g., received external of secure network 100) from reaching the execution portion of processor 132. All data icon labeled bit-pairs cannot be executed. Thus, computer 130 is protected from virus, Trojan, malware, spyware, and malign code, since information received from outside of secure network 100 is labeled as data and can never be executed.

These changes to microcode 136, combined with the specified hardware changes (e.g., e.g., bit-insertion circuitry 112) make it impossible for any non-approved code (virus, Trojan, hacking, etc.) to run. Note that a programming language could be used instead of the data language (so the data language could run and execute itself but not the second programming language), but the many security weaknesses make this the least secure option.

In embodiments, when a naturally occurring electrical glitch (or a similar interruption of bit pattern) occurs and knocks the protected computer's data language off the icon labeled bit pattern by one bit, the computer's crash and error routines (e.g., exception handling) detect and handle this offset. These crash and error routines may delete the entire byte (or more) containing the error bit (as in the above processes). In embodiments, no partial deletions of bits are allowed if there is an error, only complete bytes, instructions, or labeled bit-pairs are deleted. The error routine would restart computer processes using the next complete non-error byte that is in process. This deletion may be of multiple bytes (e.g., delete the byte that contains the error and the following byte(s) of the instruction). Any bit-offset command by a virus, hacker, or other source would be detected and deleted before execution by this process, e.g., by microcode 136.

3-State Bit Computer Systems

In embodiments, computer 130 is a 3-state bit (trinary bit) computer (ternary computer) and may use similar methods (e.g., method 400, and/or data language icon-labeled bit-pairs created by special hardware circuits) as for 2-state bit computers described above. The data language system may also reside in computers that implement paired bit-states (e.g., 4-state bit, 6-state bit, 8-state bit, and larger bit state computers).

When computer 130 is a 3-state computer, the label-bit (first bit of an icon-labeled bit-pair, such as bit-pair 295 or 395) may be assigned as follows: a 0 value for a data language label-bit (logical value of label-bit equals zero), a 1 value for a programming language level-one label-bit (logical value of label-bit equals one), and a 2 value for a programming language level-two label-bit (logical value of label-bit equals two). The second bit of the icon-labeled bit-pair could be value 0, 1, or 2, but only normal 2-state bit values (0 and 1) would be used and the 2 value would not be used at all. Limiting the second bit to equal either zero or one would maintain use of current 2-state bit programming language styles using only 0 or 1 values.

In embodiments, programming language level-one bits cannot run programming language level-two programs, commands, and reserved processes. Attempts to run level-two programs, commands, and reserved processes will result in the level-one bits being deleted, e.g., using a similar microcode or machine language routine as method 400. Programming level-two can run both programming levels one and two with no limitation. In embodiments, both programming levels can use and change all data, but all data remains non-executable on its own (as in the 2-state data language method).

4-State and 6-State Bit Computer Systems

In an embodiment, computer 130 is an N-state bit computer (where N≥4). When bits (having logical values of either zero or one) of input bitstream 191 (from outside of network 100) enter interface 110, the data language hardware circuit 112 must insert each zero and one value bit of input bitstream 191 into an N-state bit (e.g. 4-state bit, quaternary bit, N=4). These values would remain exactly the same (unchanged) and would be inserted as values zero and one (by bit-insertion circuitry 112) into an N-state bit (e.g. 4-state bit, N=4). The values zero and one in any N-state bit would always be data within the data language computer (and would be non-executable per the data language method). For program levels in an N-state bit computer system (e.g. 4-state bit, N=4), bitstream 141 is a two-state bit stream that has program code bits with logical values of either zero or one. Bit-insertion circuitry 142 (or other components of computer 130) must, with a 4-state bit system (N=4), (i) convert each zero-value bit of bitstream 141 to an N-state bit having a logical value equal to two, and (i) convert each one-value bit of bitstream 141 to an N-state bit having a logical value equal to three. Accordingly, an N-state bit having a value of zero or one is data and not executable, and an N-state bit having a value greater than one (e.g., two and three) is program code and is executable. A 6-state bit (e.g. N=6) having a value of two or three is program level 1, computer 130 can execute all data and program level 1 commands and data, but cannot run any program level 2 commands per the data language method. A 6-state bit (e.g. N=6) having a value of four or five is program level 2, computer 130 can execute all data and program commands for all lower levels without restriction. The selection of which program language level the 2-state bitstream 141 is converted to is determined by which mechanical circuit (e.g., within installation hardware 140) the IT administrators use to install the bitstream 141 into computer 130. One circuit within installation hardware 140 could convert all bitstream 141 zero and one values into corresponding 2 or 3 values which would be program level 1 labeled bit pairs. A different circuit within installation hardware 140 could be used (by the IT administrator) on 2-state bitstream 141 to convert zero and one values into corresponding 4 or 5 values which would be a program level 2 labeled bit. For example: an original 2-state bit byte with a value of 11001011 would be converted to 6-state bit values (e.g., bit values 0 through 5) as: data level=11001011, program level 1=33223233, and program level 2=55445455.

In embodiments when computer 130 is a 4-state or a 6-state bit computer, no bit spacing adjustments (or extra storage space on various storage devices or bit spacing adjustments to software) are required since the data language is self-marked (or self-labeled) within each single bit. A level-2 program may run a level-1 or a level-2 program, and a level-1 program may only run level-1 programs, data can run no commands or processes. Anytime any level tries to execute a command from a level above it, the command is deleted as per the 2-state data language method. A user's program is an example of a level-1 program, while an operating system is an example of a level-2 program. All program levels may run and interact with the data level. Accordingly, a computer implementing 4-state (and higher) bits are more adept at implementing the data language described in the embodiments hereof. For example, microcode 136 may be modified to implement the multi-level program, and data level, such that exceptions to these rules are trapped.

A 4-state (and higher even numbered state) bit computer may implement the data language described herein (e.g., method 400) in a faster and more practical way, as compared to a conventional 2-state bit computer. However, the 4-state (and higher level) bit computer must use similar bit labeling procedures as described earlier for 2-state bit computers, but does not need to insert additional bits for labeling each data/program code bit, since each bit of the 4-state computer may carry both the data/program code and the corresponding label to implement the data language.

In embodiments where computer 130 is implemented with 4-state (and higher) bits, bit-insertion circuitry 112 interfaces the secure network 100 with external devices (e.g., connecting with external networks, modems, disk drives, etc.) to receive incoming data 191 (e.g., a two-level bit-stream) directly into the two lowest-value 4-state bit positions (e.g., the values are unchanged and are either a 0 or a 1 value). Particularly, received data is not input as higher-level values of each bit. Thus, a 4-state bit with a value of 0 or 1 corresponds to data values of zero and one (similar to the icon labeled data bit of a 2-state bit computer). 4-state bit values of 2 and 3 correspond to program code values of 0 and 1 correspondingly of a 2-state bit computer. In this example, the 4-state bit computer executes the program code values similarly to the 2-state bit computer and as described herein. For example, microcode 136 may be amended to only execute instructions having bit values greater than one (e.g., two or three in the 4-state computer) ensuring no data can execute a command or action (as in the data language 2-state method).

Thus, in embodiments when computer 130 is a 4 or 6-state bit computer, bit values of 0 and 1 are self-labeled as data bits per step 410, the labeled extra-network bits of step 430, and the transmitted labeled bit of step 440, of method 400. Similarly, bit values of 2 and 3 are self-labeled as program bits per step 420, the labeled intra-network bits of step 430, and transmitted labeled bit of step 440. A self-labeled bit is itself a label-bit, as well as either a data bit or a program bit.

Similarly, in embodiments where computer 130 is a 4-state bit computer, only instructions with bits that have values of 2 and 3 are executed, treating bits with 0 and 1 values only as data bits. Thus, data received from sources external to secure network 100 that are stored as bits having only a 0 or 1 value, cannot be executed as program bits. That is, when computer 130 is a 4-state bit computer, microcode 136 (machine code execution routines) of computer 130 may have deletion routines inserted (or routines that trigger an exception) to prevent data from being executed as program code. These routines prevent any bit with a zero or one value that is loaded into processor 132 as an instruction from being executed or running commands (as in the 2-state bit method). IT Departments may use special removable drives with mechanical hardware circuits (as in the 2-state data language system) to install programs on computers within the secure network, convert between different formats (data to program or program to data), and convert software between different programming language levels within a N-state bit (e.g., e.g., 6-state bit using values 4 or 5 for programming level 2).

When program level bits are output external to a secure network, e.g., via a network, modem, etc., the 4-state bit values 2 or 3 are converted and sent (e.g., by network interface 110) as a 2-state bit value (0 or 1) such that the information may be used by conventional computers and other digital devices. Since data values are stored as 0 or 1 within the 4-state bit, no value conversion is necessary before sending that data externally from the network. Any bit values of 2 or 3 are converted (e.g., by network interface 110) to a corresponding 0 or 1 value and output from the secure network for use by conventional 2-state bit computers and devices. Any 6-state bit values of 4 or 5 may be converted to 0 or 1 values and output from the secure network for use by conventional 2-state bit computers and devices.

In embodiments when computer 130 is a 4-state or 6-state bit computer, network interface 110 does not insert label-bits, and no translation is required before the incoming data (values 0 or 1) is inserted into the 4-state or 6-state bit by the incoming (from outside secure network 100) bit-insertion circuitry 112. In such embodiments, secure network 100 includes neither bit-insertion circuitry 112, 142 nor bit-removal circuitry 145, 185. No additional storage space is required when 4-state or higher bits are used. The speed of the computer processes run normally as there is no second bit (label-bit) needed to demand extra spacing or processing time, it runs at the same speed as a 2-state bit computer. By converting bit labeled program values of 2 or 3 in 4-state bits (or values 4 or 5 for 6-state bits) to corresponding values of 0 or 1 on output, using a data language hardware circuit, the 4-state and 6-state icon-labeled bit-pair data language system is compatible with all current 2-state bit computer systems. All output would be converted to current 2-state bit format, by circuitry of network interface 110 for example. All input into the network would be converted (by circuitry of network interface 110, for example) into 4-state or 6-state bits. This would create a 4-state (or 6-state) icon-labeled bit-pair data language system such that computer 130 cannot execute any code not approved for its level (e.g. commands for program level 1 cannot execute program level 2 commands and data cannot execute any command), thus creating a secure network 100 that is protected from virus, scrap code, Trojan, malign code, etc.

Example Applications

Computer networks: Virus, Malware, Spyware and malicious code prevention and protection for computer networks.

Cars: If the engine and sensors are inside the network and all else is external, the car is a protected computer environment, that is virus proof, etc.

Artificial intelligence; Multi-state bit levels allow control of Artificial Intelligence by placing them at the lowest program language level (program level 1) with all program levels above that level (2 and higher) having priority and control of specific programs, processes, and systems. These higher-level program languages could control all of programming level 1 functions and processes, but would not be accessible to the Artificial Intelligence's programming level 1 processes and routines.

Country identification label for internet packets: If all routers within a country were treated as a network, the data language system described above would protect that network from tampering by labeling everything coming into the country's routers as external data and labeling all information generated or existing inside the country as internal data. This would directly label every bit as being either from inside the country or from outside the country. A simple program may remember the value and output a label which could be used to indicate country of origin (the home country or not, 0 or 1). This label could be placed inside each IP packet as it removes the data language labeling when it exits the router network. The IP packet label could then be read by any process that uses the IP packet. Also, a data language could be installed on the router network to gain protection for a country's router systems (treating it as a network and using the data language system to protect it just like it does a regular computer network).

Small computerized components: The data language system described above may be adapted and/or implemented on any individual machines or systems with small computerized components to make individual pieces of equipment immune to virus, etc. (ex. X-ray machine, centrifuge, individual nuclear reactor control systems, individual utilities control systems, etc.).

Aerospace: Spaceship and control/critical functions may run on a higher-level programming language and entertainment on a lower level programming language (leaving life-critical functions inaccessible to the commonly used program languages).

CONCLUSION

By including the specified hardware circuitry at input and output streams of a secure network (e.g., a network) and with changes to software to take into account the bit labeling where needed, and the addition of a small routines in the microcode or machine language routines, the resulting data language system prevents execution or running of any non-approved program or executable code. These modifications and additions prevent the computer from executing data and non-approved code to create a secure network that is protected from viruses, Trojans, malware, spyware, or malign code. Advantageously, 4-state bit (and higher state) computers need no insertion of extra bits to the incoming data-stream or spacing adjustments to software to obtain similar protection. This data language design provides for expansion into future computers with larger bit states, which may operate using multiple program levels within the network while all outside the network information is exchanged and managed safely by the data language system. When used by all computers (e.g., as a standard), the embodiments disclosed herein may eliminate almost all problems resulting from current malign codes/programs/processes (e.g., viruses, Trojans, malware, etc.).

In certain embodiments, alternative label-bit positions may be used. For example, in the above 2-state computer examples, the label-bit is inserted before the bit being labeled; however, the label-bit may be inserted after the bit being labeled, provided the hardware and methodology is consistent. In certain embodiments, the label-bit may have other values. For example, in the above 2-state computer examples, the label-bit has a zero value for data bits and a one value for program bits; however, the label-bit could have a one value for data bits and a zero value for program bits.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for preventing a networked computer within a secure environment from executing malicious code, comprising:
    receiving, at an external network interface of the secure environment, a stream of bits;
    inserting a label-bit, with a value indicative of data, adjacent each bit in the stream;
    inhibiting, within microcode, a processor of the networked computer from executing bits having a label-bit indicative of data;
    inserting, adjacent each bit of executable code received by the networked computer from within the secure environment, a label-bit with a value indicative of program code;
    detecting, by the microcode, when an instruction loaded for execution contains at least one label-bit with a value indicative of data; and
    preventing the processor from executing the instruction.

2. The method of claim 1, the step of preventing the processor from executing the instruction comprising raising an exception in the processor.

3. The method of claim 1, the step of preventing the processor from executing the instruction comprising the microcode deleting the instruction.

4. The method of claim 1, further comprising, removing the label-bit from bits being sent outside the network.

5. A computer protection system, comprising:
    a secure network environment;
    a network interface of the secure network environment operable to insert a label-bit, with a value indicative of data, adjacent each bit of a stream of bits received externally from the secure network environment;
    further comprising installation hardware communicatively coupled with the computer and configured to receive, from within the secure network environment, software comprising machine readable instructions having a plurality of program code bits, the installation hardware including bit-insertion circuitry operable to insert a label-bit, with a value indicative of program code, adjacent to each of the program code bits to form labeled bit-pairs; and
    a computer, within the secure network environment, comprising:
        a processor with microcode; and
        memory for storing the label-bits and the bits;
    wherein the microcode is adapted to detect when an instruction loaded for execution contains at least one label-bit with a value indicative of data and prevent the processor from executing the instruction.

6. The computer protection system of claim 5, the network interface further comprising bit-removal circuitry operable to remove the label-bit from a bitstream of data being output from the secure network environment.

7. The computer protection system of claim 5, wherein the microcode raises an exception to inhibit execution of the bits having a label-bit with a value indicative of data.

8. The computer protection system of claim 5, wherein the microcode deletes an instruction to inhibit execution of the bits having a label-bit with a value indicative of data.

* * * * *